United States Patent [19]
Clarke

[11] Patent Number: 5,985,191
[45] Date of Patent: Nov. 16, 1999

[54] METHOD OF FORMING AN ARTICLE VIA INJECTION MOULDING, AN ARTICLE FORMED BY THE IMPROVED INJECTION MOULDING METHOD, AND A MOULD TOOL FOR CARRYING OUT THE IMPROVED INJECTION MOULDING METHOD

[75] Inventor: Peter Reginald Clarke, Petworth, United Kingdom

[73] Assignee: Coraltech Limited, Hampshire, United Kingdom

[21] Appl. No.: 08/737,916

[22] PCT Filed: Jul. 17, 1996

[86] PCT No.: PCT/GB96/01706

§ 371 Date: Apr. 16, 1997

§ 102(e) Date: Apr. 16, 1997

[87] PCT Pub. No.: WO97/03800

PCT Pub. Date: Feb. 6, 1997

[30] Foreign Application Priority Data

Jul. 18, 1995 [GB] United Kingdom .................. 9514674

[51] Int. Cl.⁶ ........................ B29C 35/02; B29C 35/16; B29D 67/20
[52] U.S. Cl. .................. 264/55; 264/327; 264/328.16; 425/552; 425/577
[58] Field of Search ................ 264/54, 55, 327, 264/328.16; 425/552, 577; 428/158, 159, 161, 170, 218, 304.4, 316.6

[56] References Cited

U.S. PATENT DOCUMENTS

| | | |
|---|---|---|
| 3,291,875 | 12/1966 | Freedman et al. . |
| 3,424,826 | 1/1969 | Aykanian et al. .................. 264/327 |
| 3,505,435 | 4/1970 | Schmidt . |
| 3,534,128 | 10/1970 | Makowski .................. 264/327 |
| 3,574,659 | 4/1971 | Kwart et al. .................. 428/316.6 X |
| 3,662,048 | 5/1972 | Turner .................. 264/327 |
| 3,703,255 | 11/1972 | Wade . |
| 3,793,415 | 2/1974 | Smith . |
| 4,189,456 | 2/1980 | Rausing . |

FOREIGN PATENT DOCUMENTS

| | | |
|---|---|---|
| 0035916 | 9/1981 | European Pat. Off. . |
| 0659647 | 6/1995 | European Pat. Off. . |
| 1143199 | 2/1969 | United Kingdom . |
| 1145970 | 3/1969 | United Kingdom . |
| 1147748 | 4/1969 | United Kingdom . |
| 1420642 | 1/1976 | United Kingdom . |
| 2010168 | 6/1979 | United Kingdom . |
| 1589102 | 5/1981 | United Kingdom . |

Primary Examiner—Blaine Copenheaver
Attorney, Agent, or Firm—Ware, Fressola, Van Der Sluys & Adolphson LLP

[57] ABSTRACT

A cup of plastics material incorporating foaming agent has thin wall portions, namely a base 101, a lower side wall 102 and an upper side wall 103. These portions have their wall thickness determined by mould part gap. The cup also has thick wall portions, namely the corner 104, the band 105 and the rim 106, in which foaming occurs after mould opening so that the wall thickness is increased beyond that provided by the mould.

32 Claims, 8 Drawing Sheets

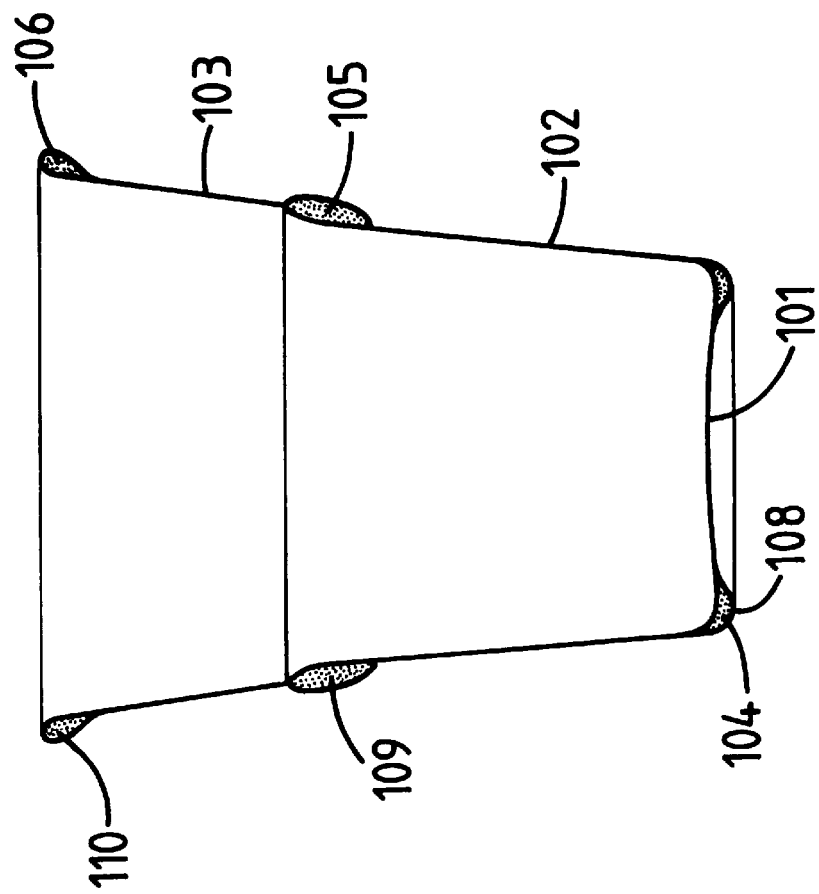
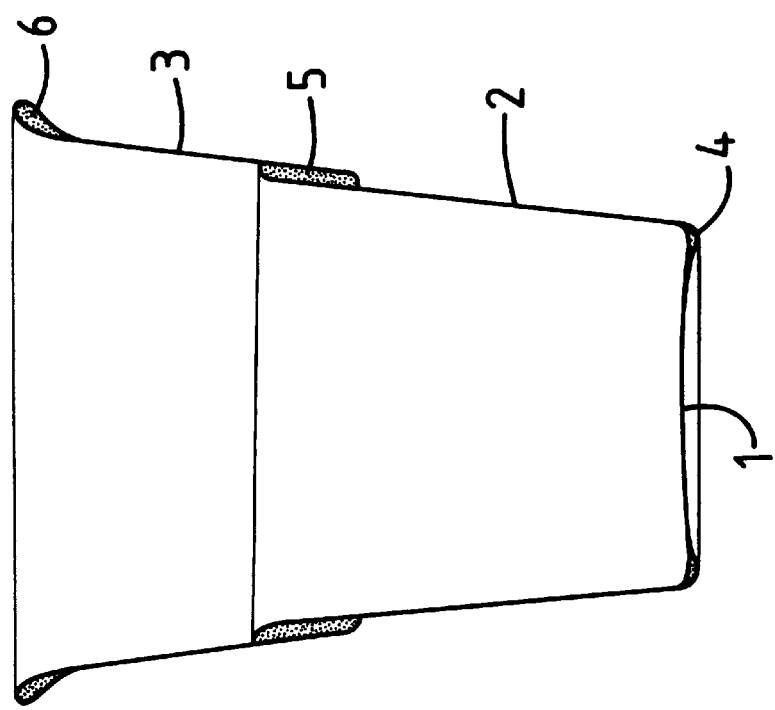

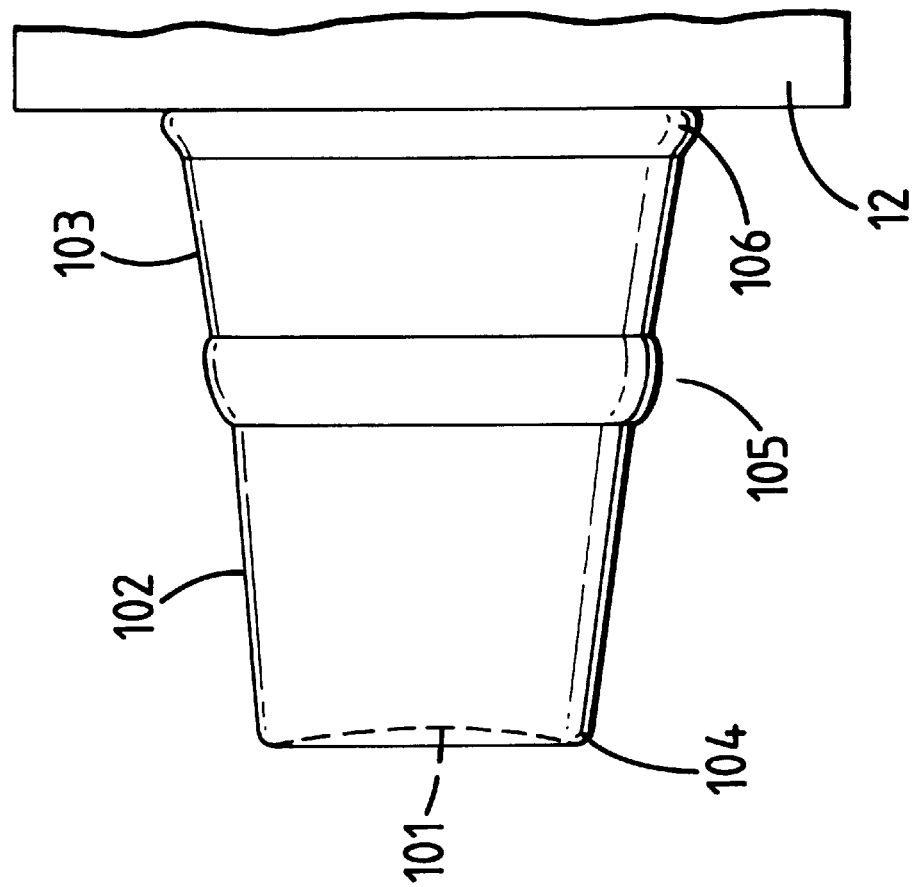
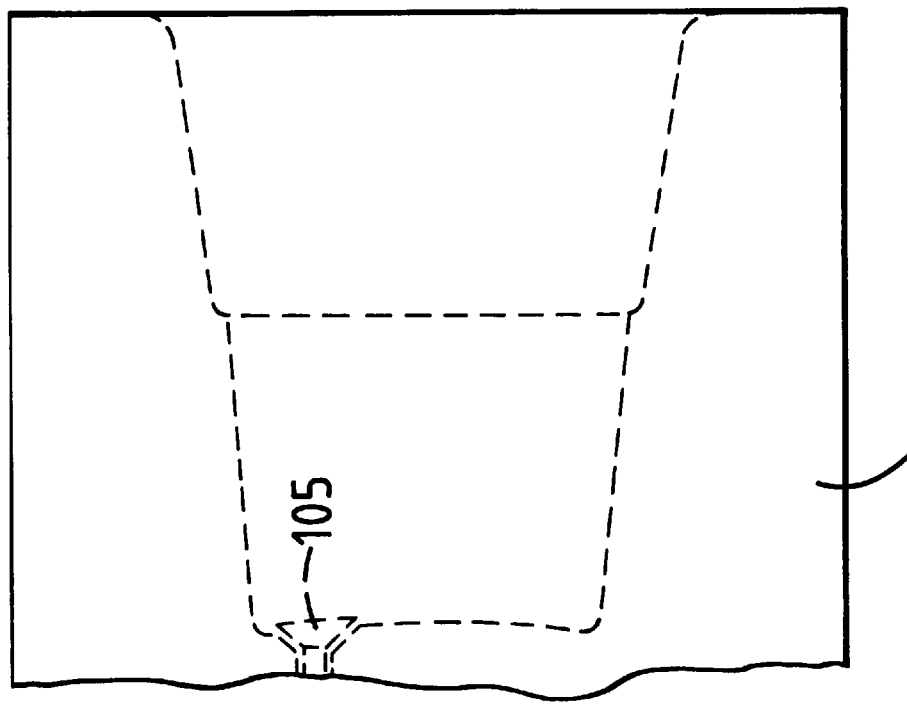
FIG. 4

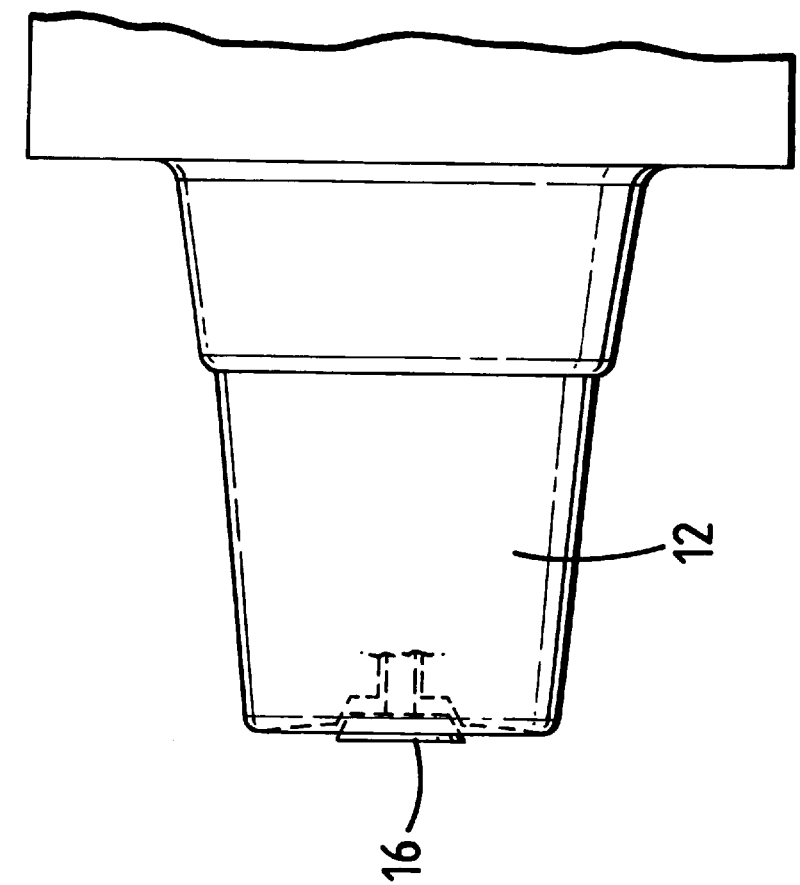
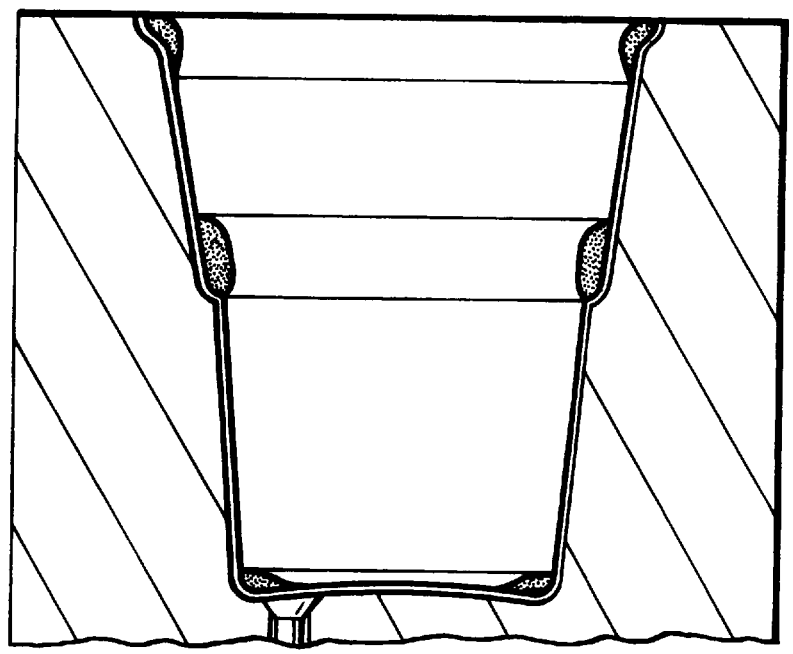
FIG. 5

METHOD OF FORMING AN ARTICLE VIA INJECTION MOULDING, AN ARTICLE FORMED BY THE IMPROVED INJECTION MOULDING METHOD, AND A MOULD TOOL FOR CARRYING OUT THE IMPROVED INJECTION MOULDING METHOD

TECHNICAL FIELD

The present invention relates to a method of forming an article via injection of plastics material into a mould.

BACKGROUND OF THE INVENTION

A recognised problem, in injection moulding from plastics materials of articles having thin walls in particular, is that at marked differences in cross-section, differential shrinkage causes blemishes in the finished surface of the article.

Despite this problem, many new designs of injection moulded article could be feasible if marked changes in cross-section were possible, without shrinkage blemishes.

SUMMARY OF THE INVENTION

The object of the present invention is to provide an improved method based on injection moulding and facilitating the production of substantial changes in cross-section.

According to one aspect of our invention there is provided a method of forming an article via injection of plastics material into a mould, the finish formed article having thin wall portion(s) and thick wall portion(s), the thick wall portion(s) being at least partially foamed, the method consisting in the steps of:

providing a mould tool defining in its closed state, between its cavity part and its core part, thin wall portion(s) whose mould part gap is to be substantially reproduced in the thin wall portion(s) of the article and thick wall portion(s) whose mould part gap is less than the thickness of the thick wall portion(s) of the finish formed article;

closing the mould tool to define the thin and thick wall portions;

injecting a plastics material mixture comprising a basic polymer and a foam producing additive into the mould tool;

allowing the plastics material mixture to at least substantially solidify in the thin wall portions of the article;

withdrawing at least a portion of one part of the mould tool from the other part before the plastics material mixture has at least substantially solidified in the thick wall portion(s) to allow the mixture to foam and form at least some of the thick wall portion(s); and ejecting the article from the mould tool.

In one alternative of our invention, the article has thick wall portion(s) at which foaming is constrained on the withdrawal step until the ejection step and allowed to occur after ejection of the article from the mould.

In another alternative, the withdrawal step consists of withdrawing one or more portions of the one part of the mould tool from its closed position to increase locally the mould part gap for foaming of the plastics material mixture to form the thick wall portion(s) of the article in the locally increased gap; and of opening the mould tool after the thick wall portion(s) have substantially solidified to shape. Alternatively, an entire mould part can be partially withdrawn to allow foaming and subsequently the mould tool is fully opened for ejection of the solidified article.

The foaming can occur against and between the withdrawn portion(s) or part of the mould tool to fully fill the locally increased mould part gap; or the foaming can occur to an extent to not fully fill the locally increased mould part gap.

In accordance with one preferred feature of our invention the withdrawal step consists of opening the mould tool before the thick wall portion(s) have solidified to shape, foaming thereof then occurring in the ambient atmosphere to form the thick wall portion(s). The moulding can be left on/in either of the core or the cavity of the mould tool, according to whether the foaming is intended to expand the article outwards or inwards in the thick wall portions.

Mechanical or pneumatic ejection means can be used.

In another alternative, the withdrawal and ejection steps occur at the same time.

One possible advantageous feature is that the step of allowing the plastics material mixture to solidify in the thin wall portion(s) of the mould tool includes the step of cooling these portions of the mould tool to a greater extent than the thick wall portion(s) thereof.

Another such feature is that the step of allowing the plastics material mixture to solidify in the thin wall portion (s) of the mould tool includes the step of cooling these portions of the mould tool and heating the thick wall portion(s) thereof.

Preferably the step of withdrawing the one part of the mould tool, or its withdrawable portion, is delayed until the surface of the plastics material mixture has substantially solidified in the thick wall portion(s).

According to another aspect of the invention there is provided an article formed of plastics material, the finish formed article having thin wall portion(s) and thick wall portion(s), the thick wall portion(s) being at least partially foamed, the article having been moulded in accordance with the method of our invention.

According to a third aspect of the invention there is provided a mould tool for carrying out the method of our invention, the mould tool having a cavity part and a core part and the mould tool defining in its closed state, between its cavity part and its core part, thin wall portion(s) whose mould part gap is to be substantially reproduced in the thin wall portion(s) of the article and thick wall portion(s) whose mould part gap is less than the thickness of the thick wall portion(s) of the finish formed article.

The mould tool can have one or more portions movably mounted on the said one part of the mould tool for increasing locally the mould part gap for forming the thick wall portion(s) of the article.

Again the mould tool can be adapted to be partially withdrawn prior to opening of it for increasing locally the mould part gap for forming the thick wall portion(s) of the article.

Conveniently the core includes an air injection port for injecting air between it and the article, whereby the article is left in the cavity part of the mould tool for inwards foaming of the thick wall portions. Alternatively the core can include means for mechanically removing the core from the article, whereby the article is left in the cavity part of the mould tool for inwards foaming of the thick wall portions. Again, the cavity can be provided with either such means.

The mould tool can include means for cooling the thin wall portion(s) of the mould tool to a greater extent than the thick wall portion(s) thereof; or means for heating the thick wall portion(s) thereof; or insulating insert(s) at the thick wall portion(s) thereof.

Preferably the mould part gap varies between the thick and thin wall portions of the mould. However it is possible for the mould part gap to be constant between the thick and thin wall portions of the mould.

Preferably the material comprises a mixture of a basic polymer, such as polypropylene, and a foam producing additive, such as the foaming agent sold under the SAFOAM trade mark by Reedy International Corporation of Keyport, N.J., U.S.A. This is a carbon dioxide foam material.

A number of alternatives, which may be discrete or combined, are envisaged for providing that the plastics mixture does not solidify before withdrawal of the mould portion and indeed for the withdrawal.

For non-solidification before withdrawal, it is possible, particularly where the mould tool cavity is thickened at the desired foaming position, to open the mould in an otherwise conventional manner at a time after the thin wall portions have solidified, but before the thick wall portions have solidified due to their greater thermal mass of their plastics mixture.

To provide more certainty of the thick plastics mixture still being not solid, the mould tool may be provided locally to its thick wall portion with less cooling than else where in the tool, by arranging cooling ducts to be distanced from the thick wall portion.

Alternatively or additionally, the mould tool, in its part on the side of the moulding where the foaming is to occur, may be provided with an insert which is of less conductive material, for instance of titanium or ceramic material, whereby the plastics material at the thick wall portion is effectively insulated from cooling. It is envisaged that this arrangement could enable the wall thickness in terms of the gap between the cavity parts to be uniform between the thick and thin wall portions, with thickening occurring only on foaming.

The withdrawal of the portion of the mould part at the thick wall portion to allow foaming may be effected by unitary opening of the mould. Alternatively, a portion of the mould may be able to be withdrawn before opening of the mould, by being relatively movable within the mould part. In either case, the withdrawal may be complete, that is far enough to be clear of the expansion of the plastics mixture at the thick wall portion. As an alternative to this, the withdrawal may be partial only in relation to the movement of the mould parts for complete opening of the mould. In this case the thick-wall, mould-part portion may be withdrawn only so far as to provide a surface against which the plastics material expands for determining its final shape, the withdrawal being completed when the material has foamed and solidified.

BRIEF DESCRIPTION OF THE DRAWINGS

To help understanding of the invention, a specific embodiment thereof together with several variations will now be described by way of example and with reference to the accompanying drawings in which:

FIG. 1 is a cross-sectional side view of an injection moulded cup able to be moulded with a mould using a technique, which appears to be known;

FIG. 2 is a similar view of a cup formed in accordance with the present invention;

FIG. 4 is a side similar view of the mould tool open for foaming of thick wall sections of the cup on the core of the mould tool;

FIG. 5 is a similar, partially sectioned view showing foaming of the thick wall sections whilst the cup is retained in cavity of the mould;

BEST MODE FOR CARRYING OUT THE INVENTION

Figure 3:
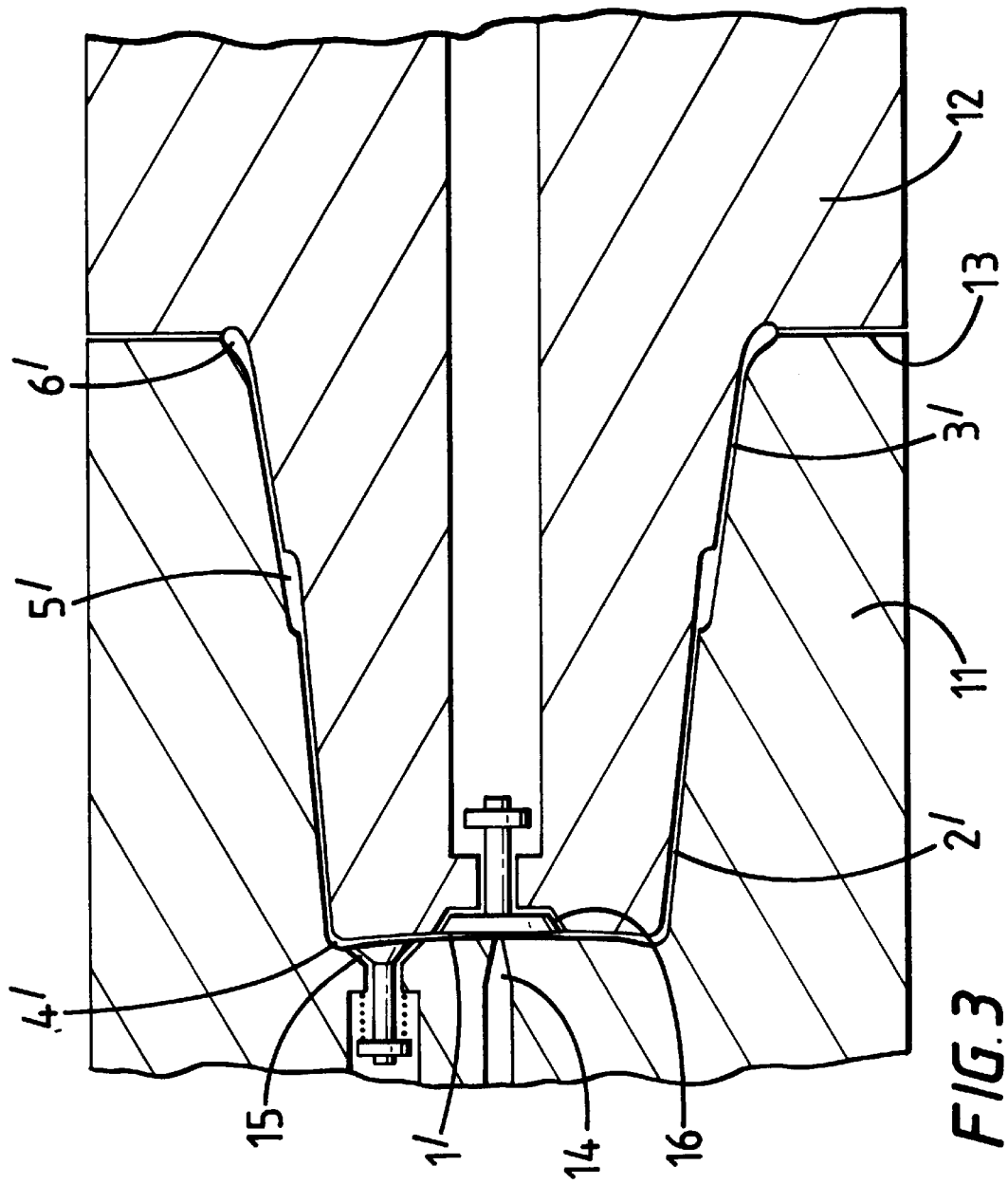
FIG. 3 is a similar view of a mould tool for preliminary moulding of the cup.

Referring first to FIG. 1, the cup has a base 1, a lower side wall 2 and an upper side wall 3, these being thin wall portions. At the corner 4 between the base and the lower side wall, at a band 5 between the upper and lower side walls and at the rim 6 there are thick wall portions. Typically the thin wall portions are 0.7 mm thick and the thick wall portions are 1.2 mm thick.

This cup could be moulded with conventional plastics materials, but due to the different wall sections, shrinkage marks could be expected to appear in the thick wall portions. In other words, conventional moulding techniques result in uneven wall thickness in the thick wall portions.

We have discovered that we can mould the cup with even wall thickness in the thick wall portions, by including a small amount of foaming agent in the plastics material. Despite having originally believed this to be a new technique, it appears to us that this may be known.

In this basic technique, we used plastics material comprising free flowing polypropylene with a small addition of foaming agent, typically less than 5% and in the region of 1%, in accordance with the directions of the suppliers of the SAFOAM agent, Reedy International Corporation of Keyport, N.J., U.S.A. In the thick wall portions, the agent causes foaming, whilst in the thin wall portions no foaming occurs. The degree of foaming can be controlled by adjustment of injection parameters such as pressure, time, temperature, quantity of plastics material and percentage of foaming agent in the material, such adjustments being routinely made in the set up of an injection moulding machine.

We believe that a combination of the higher pressure required to force the material into the thin wall portions and the increased cooling rate in the thin wall portions inhibit the formation of foaming in the thin wall portions, whereas the lower pressure present in the thick wall portions and the greater bulk of plastics material in the thick wall portions requiring longer to cool, allow foaming in these portions. Originally we believed that the foaming to fill the thick wall portions of the mould tool cavity needed to occur before opening of the mould. However we have now been surprised to discover that additional foaming can occur due to opening of the mould before cooling of the thick wall portions to solidification.

Our invention is an adaption of the use of plastics material including foaming agent to allow foaming to continue after at least partial opening of the mould in which the cup or other article is moulded.

FIG. 2 shows a cup formed in accordance with the invention. It has thin wall portions, namely a base 101, a lower side wall 102 and an upper side wall 103, in which no foaming occurs. These portions have their wall thickness determined by the mould part gap, The cup also has thick wall portions, namely the corner 104, the band 105 and the rim 106, in which foaming occurs after mould opening so that the wall thickness is increased beyond that provided by the mould. Compared with the 1.2 mm wall thickness in the band 5, using the same mould, a maximum band wall thickness of 3.2 mm is achievable. It will be noted the outer contour of the band is curved, due to restraint of its upper and lower margins 106, 107 where the wall thickness alters to being thin. On the outer surface 108 between these margins, the band bows out, The outer surface of the rim 106 also bows out. In both these instances, and indeed at the corner 104, the outer surface is substantially solidified on opening of the mould, but able to stretch as foaming occurs in the still molten plastics material at the centre of the thick wall portions, to give the shapes shown in FIG. 2. In cup of FIG. 1, such foaming as occurs, does so against the constraint of the still closed mould. In the cup of FIG. 2, the constraint on the foaming is atmospheric pressure and the skin tension of the outer surface. The shape of the rim outer surface 109 is of particular note, in that the shape in which it originally solidifies is concave. However on foaming, the concave surface has little pressure constrain on it and is blown out over-centre to the convex shape 109. This results in a maximum wall thickness of 2.7 mm despite the vertical extent of the rim being less than that of the band.

It should be noted that the 3:1 thick:thin wall thickness ratio, that is the ratio of thin wall thickness to thick wall thickness prior to foaming after mould opening, is exemplary only and the possible limits on the ratio have not yet been researched. However, we have developed a technique, described in more detail below, for allowing post-opening foaming where no initial wall thickness change is present.

Turning now to FIG. 3, the mould tool there shown has a cavity 11 and a core 12, the two being separable at a joint line 13. The cavity has an injection point 14 and a spring closed air injection port 15 in the form of a poppet valve. The core has an air injection port 16 opposite the injection port, with a free floating valve member closed by pressure in the moulding void.

On injection of the plastics material mixture, the port 16 closes and the moulding void fills. The injection parameters are adjusted such that the material reaches the cup rim 6, without completely filling the void. The foaming agent causes foaming in the thick wall portions. However this does not occur in the thin wall portions, where the pressure required to displace the material is higher and the cooling is quicker. When time has been allowed for the plastics material to at least substantially solidify in the thin wall portions of the mould 1', 2', 3', corresponding to the base 1, lower wall 2 and upper wall 3 of the cup and for some foaming in the thick wall portions 4', 5', 6' of the mould, corresponding to the corner 4, band 5 and rim 6, and before the material has solidified in the thick wall portions, the mould is opened and air pressure applied to the port 15, This separates the moulding from the cavity, and together with shrinkage onto the core, allows withdrawal of the core with the moulding.

The outer surface skins 108, 109, 110 of the material (see FIG. 2) at the thick wall portions 104, 105, 106 has at least substantially solidified, but does not constrain the foaming agent from generating sufficient pressure to create the shapes described above with reference to FIG. 2 and as also shown in FIG. 4. After a further delay to allow the moulding to cool, air is introduced via the port 16. This expands the moulding which is released from and then drops off the core, It is believed that the foaming forces the moulding into good thermal contact with the mould at the thick wall portions before opening of the mould. This enhances cooling of the plastics material to form the skins of the thick wall portions. Further use of a carbon dioxide foaming agent which absorbs appreciable energy in foaming, that is cools the material on foaming, is advantageous in quickening cooling. However, foaming agents using other gases and base polymers other than polypropylene are possible to use in the invention.

Cycle times, injection pressure and material usage, which are comparable to those for conventional thin wall moulding, have been experienced. However, detailed comparisons have not been made at this time.

Figure 6:
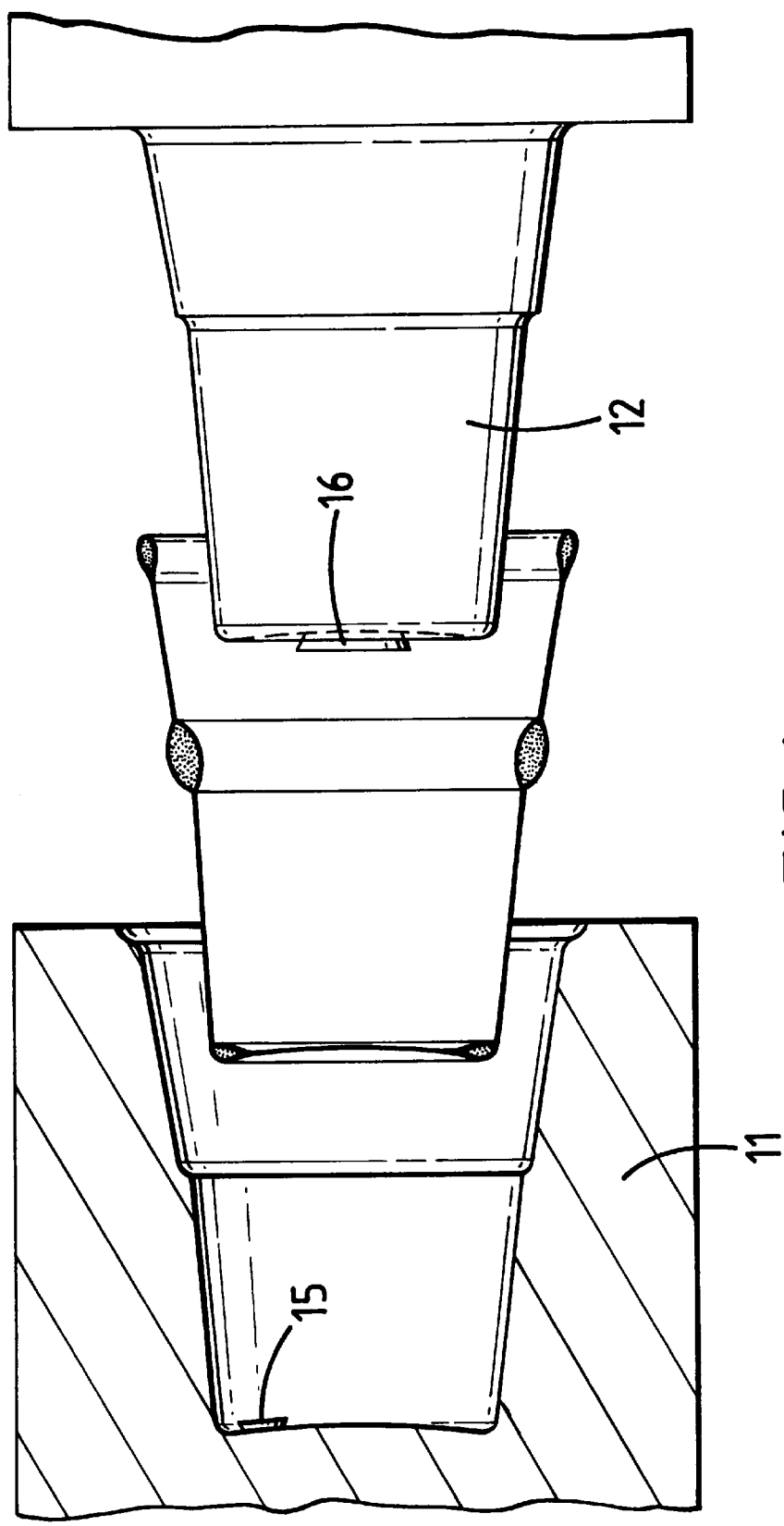
FIG. 6 is another similar view showing foaming of the thick wall sections after ejection of the cup from both the cavity and the core.

FIG. 5 shows an alternative mould opening sequence, in which air is introduced first via the port 16, with the result that the moulding is blown off the core and left in the cavity. This results in the thick wall portion expanding inwards on foaming, as shown. Then air is introduced via the port 15 blowing the cup out of the cavity. As another alternative shown with reference to FIG. 6, air can be introduced via both of ports 15 and 16, with the result that the cup leaves both the core and the cavity simultaneously and the foaming causes both inwards and outwards expansion of the thick wall portions.

Choice between these alternatives will be determined by the uses and characteristics required of the articles being produced. For instance for a clearly defined de-nesting step, foaming on the core may be advantageous. On the other hand for contouring of the outer surface of the band, either to enhance grippability or to enable display of symbols, foaming in the cavity may be advantageous.

Figure 7:
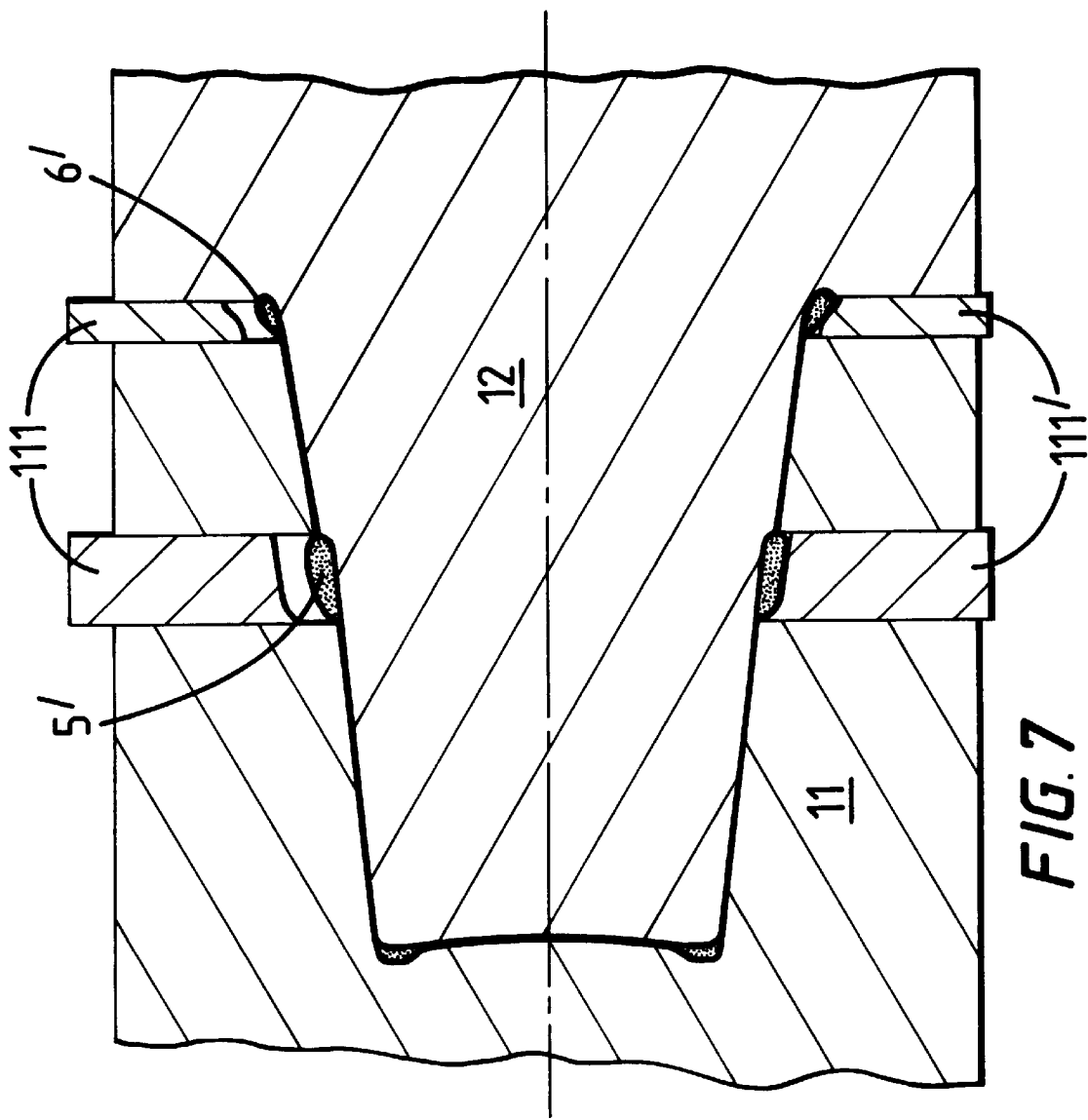
FIG. 7 in a view showing two variants of the mould tool of FIG. 3.

An important variant of the invention is shown in FIG. 7. The cavity 11 of the mould tool has radially movable parts 111, at at least some of the thick wall portions 5', 6'. After injection of the plastics material, the mould parts 111 are moved radially to locally increase the mould part gap. This may be to an extent as shown in the upper part of FIG. 7 to allow free foaming expansion.

Alternatively, as shown in the lower part of the Figure, the radial movement may be to a limited extent only, so that foaming expansion occurs against these movable mould parts 111' for better definition of finished shape of the cup. As shown at the base 1 and corner 4, the mould can have differential wall thickness where post mould opening foaming is not permitted. This can allow for instance more structural rigidity in the corner, whilst the increased wall thickness at the band and rim allows enhanced thermal insulation. (It should however be noted that structural rigidity may be provided by increased wall thickness, particularly, where moulding conditions are controlled to provide a thick surface akin.) Thus a combination of different properties can be incorporated into the cup, or other article being moulded at different positions as required. Once the desired shape has been set into the article, the mould is then fully opened and the article ejected.

Figure 8:
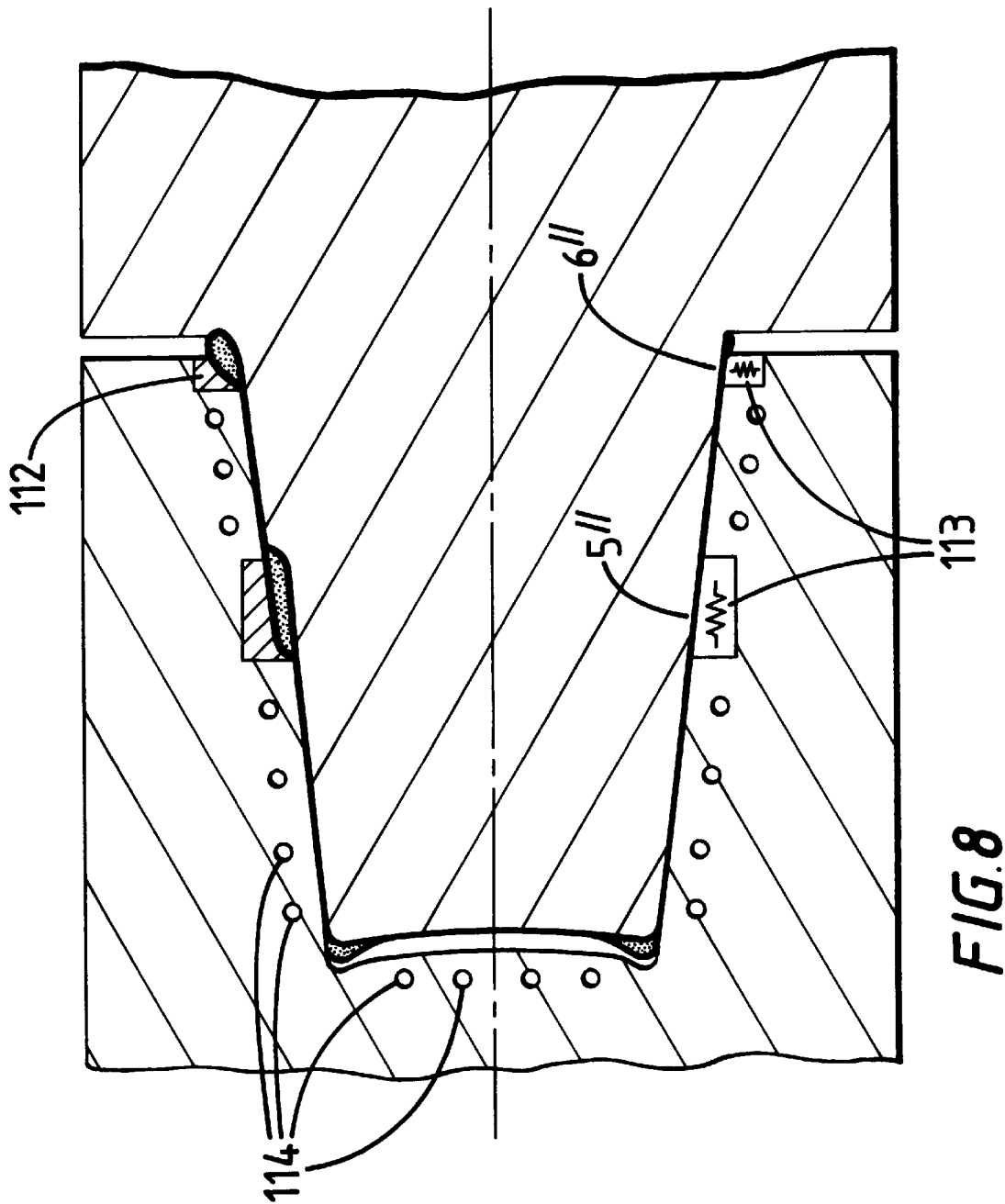
FIG. 8 is another such view showing two further variants of the mould tool.

Another variant is shown in FIG. 8, where the mould parts are bodily, but partially withdrawn. This has the effect of allowing foaming expansion in the direction of the partial withdrawal, at thick wall portions opened in this direction. FIG. 8 shows the corner 4 expanding. The arrangement in the upper part of the Figure allows the rim and band to expand height-wise of the cup and subsequently radially on opening of the mould (not shown). For this, the upper part of the Figure shows ceramic or titanium insulating inserts 112 in the cavity at both the rim and the band. These retard the cooling of the plastics material in these portions, allowing it to maintain its temperature and remain molten at the centre of the ring and rim portions for foaming on full opening of the mould tool.

In the lower part of the Figure, at the ring and rim, the mould part gap is kept constant throughout the cup's side wall upto the rim; and ohmically heated blocks 113 are provided in the cavity mould part at the ring and rim portions of the wall. These maintain the temperature to a greater extent than the ceramic inserts, and allow greater locally foaming on opening, that is to say they allow selective foaming at the constant wall thickness adjacent other thin portions which solidify before mould opening. It will be appreciated that by a combination of these alternatives, the degree of foaming attainable in different regions of the article being produced can be achieved and controlled at will.

It should be noted that by use of an ohmic block such as 113, foaming can be induced selectively in a region where the mould part gap is uniform before opening.

FIG. 8 also shows cooling ducts 114 in the cavity part of the mould for cooling the thin wall portion thereof 1', 2', 3'. By concentration of the cooling ducts at these portions, the thin wall portions of the article and the surface skins only of the thick wall portions can be solidified prior to mould opening.

Figure 9:
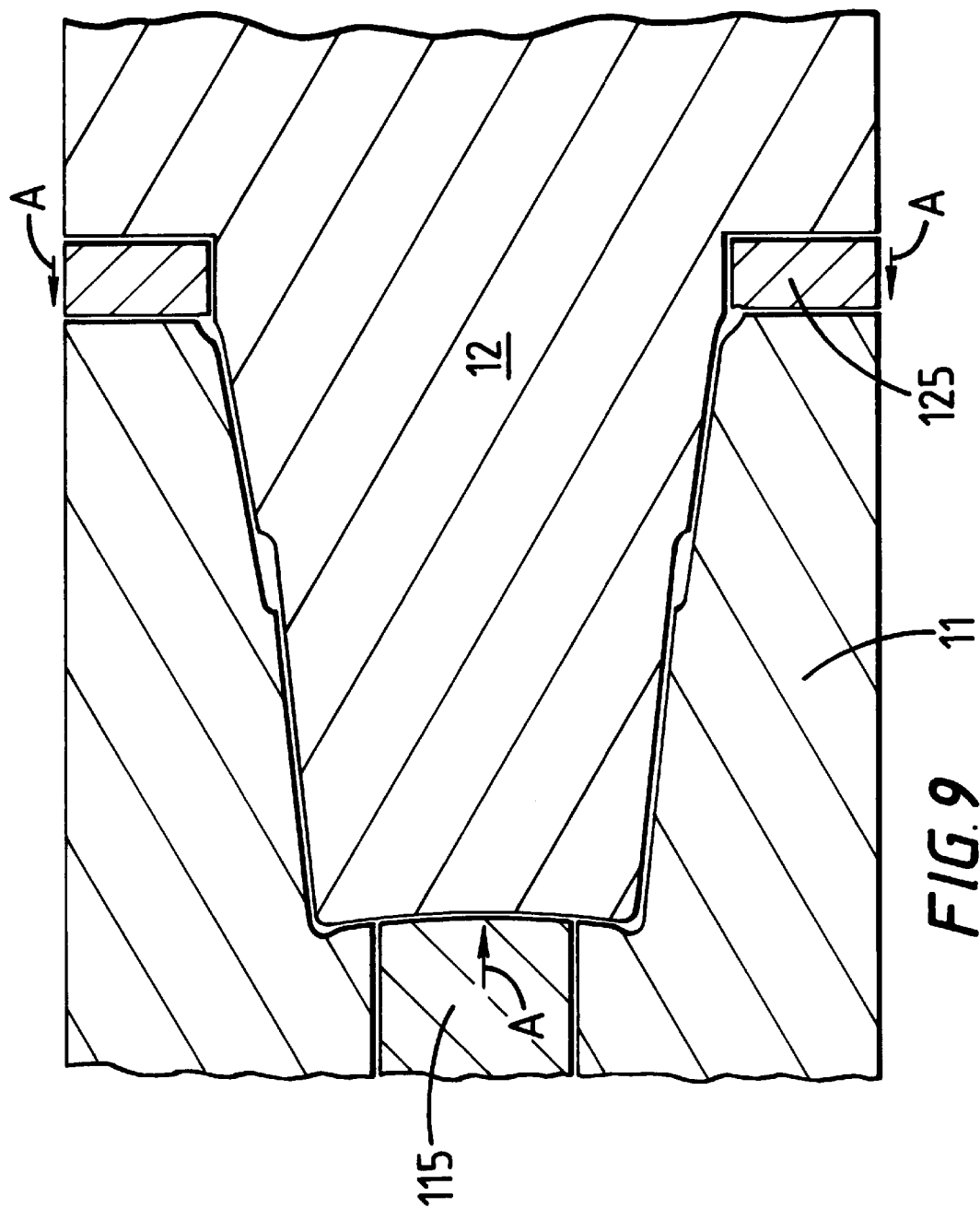
FIG. 9 is a further view of the mould tool, varied to show mechanical ejection means.

FIG. 9 shows alternatives to the use of air introduction to remove the moulded article from the core or cavity. For removal of the article from the core after foaming, the latter is provided with a stripper ring 125. For ejection of the article from the cavity, an ejector member 115 of cavity is provided. Arrows A show the direction of movement of these elements relative respectively to the core and cavity for ejection.

It should be noted that the invention is not intended to be restricted to foamed portions being at any particular region of the article with respect to the injection point. The above described embodiment has three thick wall portions as finished, firstly adjacent the injection point, secondly remote from the injection point and thirdly intermediate the other two portions. Other arrangements are possible.

Also it should be noted that although the formation of the articles involves foaming of the plastics material mixture, the internal structure of the article may vary. Usually there will be a non-uniform bubble size across a section from one skin to another. At the skins, there will be little foaming if any and progressively towards the centre, the bubble density will increase, with corresponding decrease in physical density. In certain articles, the bubbles will merge, particularly at the centre. Here, the bubbles may burst and merge to such extent as to create a discrete void extending through the article.

Further, it should be noted that more complex surface shapes are envisaged. For instance, for lettering or other surface contours in the thick wall portion(s), the cavity may have raised lettering for production of recessed contours in these portions. Further, other contours such as screw threads and snap-cap undercuts are envisaged to be mouldable by post-opening foaming in accordance with the invention. It is also envisaged that the foaming may be controlled to such extent as to facilitate the production of foamed regions of less rigidity and increased resilience with respect to unfoamed or restrainedly foamed regions.

I claim:

1. A method of forming an article via injection of plastics material into a mould having a cavity part and a core part, the finish formed article having at least one thin wall portion and at least one thick wall portion, each thick wall portion being at least partially foamed, the method consisting of the following sequential steps:

providing a mould tool defining in its closed state, between its cavity part and its core part, at least one narrow gap portion whose mould part gap is to be substantially reproduced in a corresponding thin wall portion of the finish formed article and at least one wide gap portion whose mould part gap is less than the thickness of a corresponding thick wall portion of the finish formed article;

closing the mould tool to define the narrow and wide gap portions;

injecting a plastics material mixture comprising a basic polymer and a foam producing additive into the mould tool;

allowing the plastics material mixture to at least substantially solidify in each narrow gap portion of the mould tool to produce each thin wall portion of the finish formed article;

withdrawing at least a portion of the cavity part or the core part from the core part or the cavity part respectively so as to increase the mould part gap between the cavity part and core part in the region of each wide gap portion, said withdrawing being performed before the plastics material mixture has at least substantially solidified in each wide gap portion of the mould tool so as to allow the mixture to expand by foaming and thereby form each thick wall portion of the finish formed article; and ejecting the finish formed article from the mould tool.

2. A method of forming an article as claimed in claim 1, wherein the withdrawal step consists of opening the mould tool before each thick wall portion of the finish formed article has solidified to shape, foaming expansion thereof then occurring in the ambient atmosphere to form each thick wall portion.

3. A method of forming an article as claimed in claim 1, wherein the withdrawal step is performed by injection of air between the cavity part of the mould tool and the finish formed article.

4. A method of forming an article as claimed in claim 1, wherein the withdrawal step is performed by mechanical withdrawal of the core part of the mould tool from the finish formed article.

5. A method of forming an article as claimed in claim 1, wherein the step of allowing the plastics material mixture to solidify in each narrow gap portion of the mould tool includes the step of cooling each narrow gap portion of the mould tool to a greater extent than each wide gap portion thereof.

6. A method of forming an article as claimed in claim 1, wherein the step of withdrawing is delayed until the surface of the plastics material mixture has substantially solidified in each wide gap portion.

7. A mould tool for carrying out the method of claim 1, the mould tool having a cavity part and a core part and the mould tool defining in its closed state, between its cavity part and its core part, at least one narrow gap portion whose mould part gap is to be substantially reproduced in the thin wall portion of the finish formed article and at least one wide gap portion whose mould part gap is less than the thickness of the thick wall portion of the finish formed article, the mould tool constructed so that plastics material mixture injected into each narrow gap portion can solidify before such material solidifies in each wide gap portion, so that the material in each wide gap portion can expand by foaming when at least a portion of the cavity part or the core part is withdrawn from the core part or the cavity part respectively.

8. A mould tool as claimed in claim 7, wherein part of the mould tool has one or more portions movably mounted on either the cavity part or core part of the mould tool for widening locally the mould part gap for forming each thick wall portion of the finish formed article.

9. A mould tool as claimed in claim 7, wherein part of the mould tool is dimensioned so that it can be partially withdrawn prior to opening of the mould tool for widening locally the mould part gap for forming each thick wall portion of the finish formed article.

10. A mould tool as claimed in claim 7, wherein the core includes an air injection port for injecting air between it and the finish formed article, so that the article is left in the cavity part of the mould tool for inwards foaming expansion of each thick wall portion.

11. A mould tool as claimed in claim 7, wherein the core includes means for mechanically removing the core part from the finish formed article, so that the finish formed article is left in the cavity part of the mould tool for inwards foaming expansion of each thick wall portion.

12. A mould tool as claimed in claim 7, wherein the cavity part includes an air injection port for injecting air between it and the article, so that the article is left on the core part of the mould tool for outwards foaming expansion of each thick wall portion.

13. A mould tool as claimed in claim 7, wherein the cavity part includes means for mechanically removing the cavity part from the article, so that the article is left on the core part of the mould tool for outwards foaming expansion of each thick wall portion.

14. A mould tool as claimed in claim 7, including means for cooling each narrow gap portion of the mould tool to a greater extent than each wide gap portion thereof.

15. A mould tool as claimed in claim 7, including means for heating each wide gap portion thereof.

16. A mould tool as claimed in claim 7, including at least one insulating insert located at each thick wall portion of the article.

17. A mould tool as claimed in claim 7, wherein the mould part gap varies between the wide gap and narrow gap portions of the mould.

18. A mould tool as claimed in claim 7, wherein the would part gap is constant between the wide gap and narrow gap portions of the mould.

19. A method of forming an article via injection of plastics material into a mould tool having a cavity part and a core part, the finish formed article having at least one thin wall portion and at least one thick wall portion, each thick wall portion being at least partially foamed, the method consisting:

providing the mould tool defining in its closed state, between its cavity part and its core part, at least one narrow gap portion whose mould part gap is to be substantially reproduced in a corresponding thin wall portion of the finish formed article and at least one wide gap portion whose mould part gap is less than the thickness of a corresponding thick wall portion of the finish formed article;

closing the mould tool to define the narrow and wide gap portions;

injecting a plastics material mixture comprising a basic polymer and a foam producing additive into the mould tool;

allowing the plastics material mixture to at least substantially solidify in each narrow gap portion of the mould tool to produce each thin wall portion of the finish formed article;

withdrawing at least a portion of the cavity part or the core part from the core part or the cavity part respectively before the plastics material mixture has at least substantially solidified in each wide gap portion of the mould tool to allow the mixture to expand by foaming and thereby form each thick wall portion of the finish formed article; and ejecting the finish formed article from the mould tool;

further wherein the article has at least one thick wall portion at which foaming expansion is constrained when the mould tool is at least partially opened and until the ejection step, where foaming expansion is allowed to occur after ejection of the finish formed article from the mould tool.

20. A method of forming an article as claimed in claim 19, wherein the withdrawal step consists of withdrawing at least the core part or the cavity part of the mould tool from its closed position to widen locally the mould part gap for foaming expansion of the plastics material mixture to form each thick wall portion of the finish formed article in the locally increased gap; and of opening the mould tool after each thick wall portion of the finish formed article has substantially solidified to shape.

21. A method of forming an article as claimed in claim 20, wherein the foaming occurs against and between each withdrawn portion of the mould tool so as to fully fill the locally widened mould part gap.

22. A method of forming an article as claimed in claim 20, wherein the foaming expansion occurs to an extent to not fully fill the locally widened mould part gap.

23. A method of forming an article as claimed in claim 19, wherein the withdrawal step consists of bodily and partially withdrawing at least the core part or the cavity part of the mould tool to widen locally the mould part gap for foaming expansion of the plastics material mixture to form each thick wall portion of the finish formed article against and between the mould parts in the locally widened gap; and of fully opening the mould tool after each thick wall portion has substantially solidified to shape.

24. A method of forming an article as claimed in claim 23, wherein the foaming occurs against and between the mould parts to fully fill the locally widened mould part gap.

25. A method of forming an article via injection of plastics material into a mould tool having a cavity part and a core part, the finish formed article having at least one thin wall portion and at least one thick wall portion, each thick wall portion being at least partially foamed, the method consisting:

providing the mould tool defying in its closed state, between its cavity part and its core part, at least one narrow gap portion whose mould part gap is to be substantially reproduced in a corresponding thin wall portion of the finish formed article and at least one wide gap portion whose mould part gap is less than the thickness of a corresponding thick wall portion of the finish formed article;

closing the mould tool to define the narrow and wide gap portions;

injecting a plastics material mixture comprising a basic polymer and a foam producing additive into the mould tool;

allowing the plastics material mixture to at least substantially solidify in each narrow gap portion of the mould tool to produce each thin wall portion of the finish formed article;

withdrawing at least a portion of the cavity part or the core part from the core part or the cavity part respectively before the plastics material mixture has at least substantially solidified in each wide gap portion of the mould tool to allow the mixture to expand by foaming and thereby form each thick wall portion of the finish formed article, and wherein the withdrawing consists of opening the mould tool before each thick wall portion of the finish formed article has solidified to shape, foaming expansion thereof then occurring in the ambient atmosphere to form each thick wall portion; and ejecting the finish formed article from the mould tool.

26. A method of forming an article as claimed in claim 25, wherein the withdrawal step includes withdrawal of the core from the finish formed article, so that the finish formed article is left in the cavity part of the mould tool and the foaming expansion causes each thick wall portion to increase in thickness inwardly, with the outside shape of the finish formed article being controlled locally by the cavity part of the mould.

27. A method of forming an article as claimed in claim 26, wherein the withdrawal step includes injection of air between the core part of the mould tool and the article.

28. A method of forming an article as claimed in claim 26, wherein the withdrawal step includes mechanical withdrawal of the core part of the mould tool from the article.

29. A method of forming an article as claimed in claim 25, wherein the withdrawal step includes injection of air between the cavity part of the mould tool and the article, so that the article is left on the core part of the mould tool and the foaming expansion causes each thick wall portion to increase in thickness outwardly, with the inside shape of the article being controlled locally by the core part of the mould.

30. A method of forming an article as claimed in claim 25, wherein the withdrawal step and the ejection step occur at the same time.

31. A method of forming an article via injection of plastics material into a mould tool having a cavity part and a core part, the finish formed article having at least one thin wall portion and at least one thick wall portion, each thick wall portion being at least partially foamed, the method consisting:

providing the mould tool defining in its closed state, between its cavity part and its core part, at least one narrow gap portion whose mould part gap is to be substantially reproduced in a corresponding thin wall portion of the finish formed article and at least one wide gap portion whose mould part gap is less than the thickness of a corresponding thick wall portion of the finish formed article;

closing the mould tool to define the narrow and wide gap portions;

injecting a plastics material mixture comprising a basic polymer and a foam producing additive into the mould tool;

allowing the plastics material mixture to at least substantially solidify in each narrow gap portion of the mould tool to produce each thin wall portion of the finish formed article, said step including the step of cooling each narrow gap portion of the mould tool and heating each wide gap portion thereof;

withdrawing at least a portion of the cavity part or the core part from the core part or the cavity part respectively before the plastics material mixture has at least substantially solidified in each wide gap portion of the mould tool to allow the mixture to expand by foaming and thereby form each thick wall portion of the finish formed article; and ejecting the finish formed article from the mould tool.

32. A method of forming an article via injection of plastics material into a mould tool having a cavity part and a core part, the finish formed article having at least one thin wall portion of substantially non-cellular consistency and at least one thick wall portion, each thick wall portion being at least partially foamed and thereby of at least a partially cellular consistency, the method consisting of the following sequential steps:

providing the mould tool defining in its closed state, between its cavity part and its core part, at least one narrow gap portion whose mould part gap is to be substantially reproduced in a corresponding thin wall portion of the finish formed article and at least one wide gap portion whose mould part gap is less than the thickness of a corresponding thick wall portion of the finish formed article;

closing the mould tool to define the narrow and wide gap portions;

injecting a plastics material mixture comprising a basic polymer and a foam producing additive into the mould tool;

allowing the plastics material mixture to at least substantially solidify in each narrow gap portion of the mould tool to produce each thin wall portion of the finish formed article;

withdrawing at least a portion of the cavity part or the core part from the core part or the cavity part respectively before the plastics material mixture has at least substantially solidified in each wide gap portion of the mould tool to allow the mixture to expand by foaming and thereby form each thick wall portion of the finish formed article; and ejecting the finish formed article from the mould tool.

* * * * *

UNITED STATES PATENT AND TRADEMARK OFFICE
CERTIFICATE OF CORRECTION

PATENT NO.  : 5,985,191
DATED       : November 16, 1999
INVENTOR(S) : Peter Reginald Clarke It is certified that error appears in the above-identified patent and that said Letters Patent is hereby corrected as shown below:

In column 5, line 2, "gap," should be --gap.--.
In column 5, line 12, "out," should be --out.--.
In column 5, line 55, "15," should be --15.--.
In column 6, line 51, "akin" should be --skin--.
In column 9, line 44 (claim 18, line 1) "would" should be --mould--.
In column 10, line 51 (claim 25, line 7) "defying" should be --defining--.

Signed and Sealed this

Second Day of May, 2000

Attest:

Attesting Officer

Q. TODD DICKINSON

Director of Patents and Trademarks